Patented July 31, 1945

2,380,475

UNITED STATES PATENT OFFICE 2,380,475

CATALYSTS FOR THE ADDITION POLYMERIZATION OF UNSATURATED ORGANIC COMPOUNDS

William D. Stewart, Akron, Ohio, assignor to The B. F. Goodrich Company, New York, N. Y., a corporation of New York No Drawing. Application February 19, 1941, Serial No. 379,715

20 Claims. (Cl. 260—84.5)

This invention relates to the polymerization of unsaturated organic compounds which are capable of undergoing an addition polymerization to form high molecular weight linear polymers, more particularly to the polymerization of conjugated butadienes either alone, in mixtures with one another or with other polymerizable comonomers such as the vinyl and vinylidene compounds. The principal object of the invention is to provide a new class of catalysts or accelerators of polymerization by the use of which improved polymers may be obtained in increased yield and in a much shorter interval of time.

It is known that addition polymerizations may be accelerated or promoted by the presence of various substances among which are oxygen and oxygen yielding compounds such as hydrogen peroxide, benzoyl peroxide, and per-salts. However, with the use of such known polymerization initiators, considerable difficulty is still experienced in obtaining high yields of a desirable polymer in a short interval of time. Particularly in the commercial manufacture of polymers by emulsion polymerization, the production schedule is frequently disrupted by slow reactions and long induction periods before the polymerization starts.

I have now discovered a large number of substances which have been termed redox systems because of their property of catalyzing or promoting oxidation reduction reactions, particularly those occurring in biological processes, which substances are quite effective in promoting addition polymerizations and which are vastly superior to any previously described polymerization initiators or accelerators in that the polymerization is carried out in a much shorter time, the induction period is largely eliminated, lower temperatures for the polymerization may be employed and consequently a higher molecular weight more linear polymer possessing more desirable properties is obtained.

This invention is concerned with the use in addition polymerizations of those redox systems which comprise certain sulfur containing compounds having a heavy metal salt in combination therewith. The sulfur containing compounds which, when combined with a heavy metal salt, have been found to be effective in promoting addition polymerizations are members of the class which may be defined, broadly, as aliphatic organic compounds containing at least one but not more than two divalent sulfur atoms, having at least one sulfur atom connected by a single valency to an aliphatic radical containing at least one hydrophilic group. Included in this class of compounds are aliphatic organic compounds containing the thiol (—SH), the sulfide (—S—), or the disulfide (—S—S—), linkage bonded by a single valency to an aliphatic radical containing one or more hydrophilic substituents such as carboxy groups, amino groups, hydroxy groups, carbonyl groups, sulfonic acid groups or the like. Examples of such sulfur containing compounds are aliphatic compounds containing a thiol linkage and a hydrophilic group such as thiolactic acid (thioglycollic acid), alpha thiol propionic acid (thiolactic acid), alpha thiol butyric acid, alpha thiol isobutyric acid, monothio ethylene glycol (beta mercapto ethanol), beta thiol ethyl amine (beta amino ethyl mercaptan), cysteine (beta thiol alpha amino propionic acid), glutathione (glutamyl cysteinyl glycine) and the like; aliphatic compounds containing a sulfide linkage —S— and an aliphatic radical containing a hydrophilic substituent such as thio diglycol, ethyl beta hydroxy ethyl sulfide, 2—2' diamino diethyl sulfide, methyl beta amino ethyl sulfide, diethyl dithio sulfo succinate, methionine (alpha amino gamma methyl thiol butyric acid), sugar mercaptals such as dextrose ethyl mercaptal and many others; and compounds containing a disulfide linkage, —S—S—, and an aliphatic radical containing a hydrophilic group such as dithio diglycollic acid, beta dithiodipropionic acid, cystine (beta-dithio-alpha-diaminodipropionic acid), and many others.

As hereinabove stated these sulfur containing compounds are effective in promoting polymerizations when combined with a heavy metal salt. The term heavy metal as used herein is meant to include metallic elements which have a density greater than four, an atomic weight greater than forty and a low atomic volume (ratio of atomic weight to density) and consequently appear substantially at the minimum points above an atomic weight of forty on Lothar Meyer's curve of atomic volumes. (See any standard textbook of inorganic chemistry such as Ephraim, "Textbook of Inorganic Chemistry," p. 39, or Caven and Lander, "Systematic Inorganic Chemistry," facing p. 30.) The term "heavy metal" includes, therefore, those metallic elements appearing in the center positions of the long periods of a periodic table arranged in short and long periods, and especially those occurring in the 6th to 12th positions of the long periods (considering the alkali metals to occupy the first position and all the rare earth metals to occupy a single position), that is, the elements occurring in group VIII of the Mendeleef Periodic Table such as iron, cobalt and nickel, those in subgroup B of groups I and II of the Mendeleef Periodic Table such as copper, silver, zinc, cadmium and mercury, and those in subgroup A of groups VI and VII of the Mendeleef Periodic Table such as chromium, manganese and molybdenum.

The class of redox systems of this invention is meant to include broadly any of the heavy metals mentioned above when combined with any of the sulfur containing compounds mentioned above in such a manner that the metal is present as one of its salts rather than in the elemental state. The metal salt may be combined with the sulfur compound either as a salt or in a complex compound, of uncertain chemical structure, or combinations of metallic salts with sulfur containing compounds not known to form complexes or salts of a definite chemical structure may be used. In the latter event the metal may be added as one of its simple salts while the sulfur compound may be added as such or as one of its simple salts.

The preferred redox systems are those which contain an aliphatic compound having a thiol or a disulfide linkage and also an amino, hydroxy or carboxy group, in combination with a water soluble salt of a heavy metal occurring in the 6th to 12th positions of the first long period of the periodic table such as iron, cobalt, nickel, copper and manganese. Particularly preferred are those redox systems which are known to promote or catalyze oxidation reduction reactions occurring in biological processes such as heavy metal cysteine or glutathione systems.

In the practice of this invention monomeric compounds or mixtures of monomers are polymerized by well known methods of polymerization such as by polymerization in homogeneous systems or by polymerization in emulsions in presence of catalytic amounts of the redox systems of this invention. In the emulsion polymerization process which is at present preferred, the monomer or monomer mixture is emulsified in a nonsolvent liquid, usually water, with the aid of an emulsifying agent and polymerization is then effected by adding the heavy metal, sulfur containing compound of this invention together, if desired, with various other substances, the nature of which will be described hereinafter, and agitating the emulsion until polymer is found. The resulting polymerized emulsion containing polymer particles dispersed in a liquid medium greatly resembles natural rubber latex and may be coagulated in the usual manner to yield the solid polymers.

The amount of the redox system to be used in polymerization may be varied over rather wide limits provided that an excessive amount of the redox system does not inhibit or poison the polymerization reaction. For most purposes only catalytic amounts of the redox system, say less than 2% by weight based on the weight of the monomers are preferred and in most instances the polymerization proceeds most rapidly when from .01 to 1% of the redox system is present. When the sulfur containing compound and heavy metal are added as separate compounds a mixture of about .5% of the sulfur containing compound and .1% of the heavy metal salt is preferred. When using some heavy metals, particularly copper and manganese, however, it is desirable to use even smaller concentrations of the heavy metal salt, less than 0.01%, since these metals in higher concentration tend to inhibit the polymerization.

As has been mentioned hereinabove, the redox systems of this invention may be used generally in the polymerization of those unsaturated organic compounds which are capable of undergoing an addition polymerization to form a high molecular weight linear polymer. Included in this class of monomers are the conjugated butadienes such as butadiene, isoprene, dimethyl butadiene, chloroprene, piperylene and the like all of which contain a

group; monomer mixtures of two or more of these butadienes such as a mixture of butadiene and dimethyl butadiene; and monomer mixtures of one or more of these conjugated butadienes with one or more other compounds which also contain a

group and copolymerize with conjugated butadienes such as mixtures of butadiene with vinyl compounds including aryl olefins and substituted aryl olefins such as styrene, p-chloro styrene, p-methoxy styrene, vinyl naphthalene and the like, acrylic and methacrylic acids, esters, nitriles, and amides such as acrylic acid, acrylonitrile, methacrylonitrile, methyl acrylate, methyl methacrylate, butyl acrylate, methacrylamide and the like and other vinyl compounds such as vinyl ketones, vinyl ethers, vinyl carbazole, vinyl furane and the like. Monomer mixtures of butadienes with other compounds containing a

group such as vinylidene chloride and the like may also be used. All these monomers and monomer mixtures when polymerized or copolymerized in the manner herein described form high molecular weight linear polymers. When the conjugated butadiene is the monomer or is the predominant constituent of a monomer mixture such polymers are rubbery in character.

Other monomers or monomer mixtures which are capable of undergoing an addition polymerization and which may be used in the process of this invention are the above mentioned vinyl and vinyldiene compounds as well as other vinyl compounds such as vinyl chloride and vinyl acetate, either alone or in mixtures with one another, all of which polymerize to yield a linear polymer of a thermoplastic resinous character.

The sulfur containing compound-heavy metal redox systems of this invention may be used in the polymerization of monomers in emulsions prepared with various emulsifying agents and containing various other initiators, promoters, accelerators or modifiers of polymerization. As emulsifying agents, partially neutralized fatty acid soaps such as 70-90% neutralized myristic or palmitic acids are particularly effective but other well known emulsifying agents including completely neutralized fatty acid soaps such as sodium oleate and sodium palmitate and hymolal sulfates or sulfonates such as sodium lauryl sulfate and sodium isolutyl naphthalene sulfonates may also be employed.

The redox systems containing an aliphatic sulfur containing compound of the character described and a heavy metal are preferably used to accelerate polymerizations initiated with the well known oxygen yielding compounds such as hydrogen peroxide, organic peroxides, potassium persulfate, sodium perborate, potassium percarbonate and the like, but may also be used in polymerization induced by other known polymerization initiators such as diazoamino benzene, trichloroacetic acid and carbon tetrachloride. They also may be used advantageously in the polymerization of conjugated butadienes carried out in presence of a peroxide and a peroxide activator such as sodium pyrophosphate, amino acids and saturated fatty acids, or in presence of a substance which is a reducing agent such as sulfur dioxide, or in presence of both an oxidizing and a reducing agent. They may also be used together with other redox systems which contain a heavy metal salt combined with other compounds including sodium pyrophosphate, levulinic acid, quebrachitol and cholesterol such as are disclosed in copending applications of William D. Stewart, Serial Nos. 379,713, 379,714, 379,716 and 379,717 filed Feb. 19, 1941. Moreover, the heavy metal, sulfur containing compounds herein disclosed may be used to effect polymerizations carried out in the absence of any added initiator.

It is quite surprising that the sulfur containing compounds of this invention in association with a heavy metal should promote polymerizations inasmuch as most sulfur containing compounds such as the well known natural rubber vulcanization accelerators like the thiazoles and dithiocarbamates are generally inhibitors of polymerization and other sulfur containing compounds known as polymerization modifiers such as dialkyl dixanthogens, diaryl disulfides and thiuram disulfides which increase the solubility and plasticity of the polymer usually slow down the polymerization reaction. Moreover, certain heavy metal salts when used in concentrations greater than about 0.1% also act to slow down the polymerization. However, the redox systems of this invention containing a sulfur compound of the character described combined with a heavy metal salt, greatly accelerate the polymerization reaction. This phenomena is contrary to the normally expected result.

Although the exact manner in which the redox systems of this invention accelerate polymerizations is not known with certainty, it is believed that the redox system promotes or catalyzes an oxidation reduction reaction which oxidizes or activates the monomer molecules to such an extent that they are then capable of initiating a chain reaction which produces a linear polymer. The redox system may directly catalyze the oxidation of the monomer by an oxidizing agent such as a peroxide, if such is present, or it may be auto-oxidizable, and be capable of inducing monomer oxidation or activation by an oxidation reduction involving the redox system itself, or some other mechanism may be responsible for the increase in the rate of polymerization and for the improved properties of the polymerization products. The association of small amounts of heavy metals with various "sulfur containing compounds" in biological systems which undergo oxidation reduction reactions is well known and many theories have been propounded for an explanation of such biological oxidoreductions. Since it is believed that the initiation of polymerization reactions may be quite similar to biological oxidoreduction particularly as regards the role of the redox catalyst, analogies of polymerization systems with biological systems have proved of great value in elucidating the action of the redox systems of this invention. It is to be understood however that the invention is not to be limited by any proposed theory since the inclusion of the substances herein described and herein designated as redox systems in polymerization mixtures greatly accelerates the process and also improves the quality of the polymerization products.

In order to illustrate the practice of this invention and to show the accelerating effect of the redox systems herein disclosed upon polymerizations, an emulsion containing the following ingredients is prepared:

| | |
|---|---|
| Butadiene _____grams__ | 55 |
| Acrylonitrile _____do____ | 45 |
| Hydrogen peroxide (3½% solution)____cc__ | 10 |
| Emulsifying solution (2½% aqueous solution of myristic acid 85% neutralized with NaOH)_____cc__ | 250 |
| Polymerization modifier_____grams__ | 0.3 |

This emulsion is then divided into equal parts and various redox systems are added to the emulsion. These emulsions containing added redox systems together with a control are sealed in separate glass tubes and polymerized by rotating at a constant temperature of 30° C. The following table shows the yield of the rubber-like butadiene acrylonitrile copolymer obtained, and the time required for the polymerization for tubes containing various redox systems and for the control.

| Redox system | Yield | Time |
|---|---|---|
| | Per cent | Hours |
| None (control) | 98 | 45 |
| Cobalt chloride, 0.01% Cysteine hydrochloride, .10% | 98 | 29 |
| Cobalt chloride, 0.01% Cystine, 0.10% | 98 | 28 |
| Ferric sulfate, 0.01% Cystine, 0.10% | 99 | 38 |
| Zinc sulfate, 0.01% Cystine, 0.10% | 95 | 29 |
| Cuprous chloride, 0.001% B-mercaptoethanol, 0.50% | 95 | 23 |
| Cuprous chloride, 0.001% Glutathione, 0.50% | 97 | 23 |
| Nickel sulfate, .01% B-mercaptoethanol, .50% | 97 | 18 |
| Mercuric chloride, .01% B-mercaptoethanol, .50% | 97 | 18 |

It may be seen that in all cases the use of the redox systems of this invention decreases the time required for the polymerization. Tests on the copolymers obtained also show that the practice of this invention yields a product which is more plastic, and which when vulcanized produces improved vulcanizates.

In another example of this invention an emulsion prepared as described above is polymerized in presence of various redox systems, and the rate of polymerization is measured by determining the percent yield at various intervals during the process. The accelerating effect of the redox system is shown below:

| Redox system | Per-cent yield after 7½ hrs. | Per-cent yield after 10½ hrs. | Per-cent yield after 12½ hrs. | Per-cent yield after 23 hrs. | Per-cent yield after 45 hrs. |
|---|---|---|---|---|---|
| None (control) | 0 | 0 | 0 | 45 | 94 |
| Ferrous ammonium Sulfate, 0.05% (control) | 0 | 7 | 38 | 93 | |
| Ferrous ammonium sulfate, 0.05% Glutathione, .50% | 70 | 83 | 93 | | |
| Ferrous ammonium sulfate, 0.05% 2-2' diamino diethyl sulfide, 0.50% | 49 | 85 | 92 | | |
| Ferrous ammonium sulfate, 0.05% Cysteine hydrochloride, 0.50% | 66 | 89 | 93 | | |
| Ferrous ammonium sulfate, 0.05% Diethyl dithiosulfo succinate, 0.50% | 71 | 90 | 93 | | |
| Ferrous ammonium sulfate- 0.05% B-mercaptoethanol, 0.50% | 76 | 90 | 94 | | |

The table shows that with the redox systems of this invention polymerization is substantially complete in 12½ hrs. while with no redox system 45 hrs. is required and with a heavy metal salt alone 23 hrs. is required. Other embodiments of the invention in which various other redox systems are used with various other monomers and monomer mixtures, catalysts and emulsifying agents also show that the polymerization velocity is increased by the practice of this invention.

In the practice of the invention it is sometimes desirable to add various substances other than those mentioned above to the polymerization recipe. For example when employing redox systems which are very effective in catalyzing biological exodoreduction reactions such as the glutathione-heavy metal system it may be desirable to add colloids which are usually present in biological systems as "carriers" for the redox system such as proteins, polypeptides, peptides, or other colloidal material. It may also be desirable to add materials which influence the quality of the finished polymer such as plasticizing or stabilizing agents for the polymer.

The practice of this invention also allows polymerizations to proceed rapidly under conditions where polymerization would ordinarily be impossible, because the great accelerating effect of the redox system more than counteracts the inhibiting effect of other substances which would prevent the polymerization. Many such inhibiting substances are difficult to exclude from the polymerization batch because they are present as impurities in the monomers or in other essential materials.

Although various embodiments of the invention have been herein disclosed, it is not intended that the invention be limited solely thereto for it will be obvious to those skilled in the art that many modifications and variations are within the spirit and scope of the invention as defined by the appended claims.

I claim:

1. The method which comprises subjecting a polymerizable material consisting of at least one unsaturated organic compound which contains a

group and which undergoes in aqueous emulsion an addition polymerization to form a high molecular weight linear polymer, to polymerization in aqueous emulsion in the presence of a catalyst comprising a water-soluble heavy metal salt combined with an aliphatic organic compound containing at least one but not more than two divalent sulfur atoms each of which is connected by its two valences to two different atoms, and having at least one of said sulfur atoms connected by at least one of its two valences to an aliphatic radical containing at least one hydrophilic group, the total concentration of the heavy metal salt and the said aliphatic organic compound being less than 2% by weight of the material polymerized, and the concentration of the heavy metal salt being such that the polymerization proceeds more rapidly than in the absence of the heavy metal salt.

2. The method of claim 1 in which the material subjected to polymerization is a polymerizable conjugated butadiene.

3. The method of claim 1 in which the material subjected to polymerization is a mixture of a poly- merizable conjugated butadiene and at least one other compound which contains a

group and is copolymerizable therewith in aqueous emulsion.

4. The method which comprises subjecting a mixture of a polymerizable conjugated butadiene and at least one other compound which contains a

group and is copolymerizable therewith in aqueous emulsion, to polymerization in aqueous emulsion in the presence of a catalyst comprising a water soluble heavy metal salt combined with an aliphatic organic compound containing a single divalent sulfur atom connected by one of its valences to a hydrogen atom and by the other of its valences to an aliphatic radical containing at least one hydrophilic group, the total concentration of the heavy metal salt and the said aliphatic organic compound being less than 2% by weight of the material polymerized, and the concentration of the heavy metal salt being such that the polymerization proceeds more rapidly than in the absence of the heavy metal salt.

5. The method of claim 4 in which the heavy metal salt is a salt of a heavy metal occurring in the 6th to 12th positions of the first long period of the periodic table.

6. The method of claim 4 in which the heavy metal salt is a salt of a heavy metal occurring in the 6th to 12th positions of the first long period of the periodic table; and the aliphatic organic compound is an hydroxy-substituted aliphatic mercaptan.

7. The method of claim 4 in which the material polymerized is a mixture of butadiene-1,3 and at least one copolymerizable vinyl compound; the heavy metal salt is a salt of a heavy metal occurring in group VIII and the first long period of the periodic table; and the aliphatic organic compound is an hydroxy-substituted aliphatic mercaptan.

8. The method of claim 4 in which the material polymerized is a mixture of butadiene-1,3 and at least one copolymerizable vinyl compound; the heavy metal salt is a salt of a heavy metal occurring in group VIII and the first long period of the periodic table; and the aliphatic organic compound is beta mercapto ethanol.

9. The method of claim 4 in which the material polymerized is a mixture of butadiene-1,3 and acrylonitrile and the catalyst comprises beta mercapto ethanol and a water soluble cobalt salt.

10. The method which comprises subjecting a mixture of a polymerizable conjugated butadiene and at least one other compound which contains a

group and is copolymerizable therewith in aqueous emulsion, to polymerization in aqueous emulsion in the presence of a catalyst comprising a water-soluble heavy metal salt combined with an aliphatic organic compound containing a single divalent sulfur atom connected by one of its valences to a hydrogen atom and by the other of its valences to an aliphatic radical containing at least one amino group and at least one carboxy group, the total concentration of the heavy metal salt and the aliphatic organic compound being less than 2% by weight of the material polymerized and the concentration of the heavy metal salt being such that the polymerization proceeds more rapidly than in the absence of the heavy metal salt.

11. The method of claim 10 in which the material polymerized is a mixture of butadiene-1,3 and a copolymerizable vinyl compound; and the heavy metal salt is a salt of a heavy metal occurring in the 6th to 12th positions of the first long period of the periodic table.

12. The method of claim 10 in which the material polymerized is a mixture of butadiene-1,3 and a copolymerizable vinyl compound; the heavy metal salt is a salt of a heavy metal occurring in the 6th to 12th positions of the first long period of the periodic table; and the aliphatic organic compound is glutathione.

13. The method of claim 10 in which the material polymerized is a mixture of butadiene-1,3 and acrylonitrile; and the catalyst comprises glutathione and a water soluble copper salt.

14. The method which comprises subjecting a mixture of a polymerizable conjugated butadiene and at least one other compound which contains a

group and is copolymerizable therewith in aqueous emulsion, to polymerization in aqueous emulsion in the presence of a catalyst comprising a water soluble heavy metal salt combined with an aliphatic organic compound of the formula

wherein X is an aliphatic radical containing at least one hydrophilic group, the total concentration of the heavy metal salt and the aliphatic organic compound being less than 2% by weight of the material polymerized and the concentration of the heavy metal salt being such that the polymerization proceeds more rapidly than in the absence of the heavy metal salt.

15. The method of claim 14 in which the heavy metal salt is a salt of a heavy metal occurring in the 6th to 12th positions of the first long period of the periodic table; and the aliphatic organic compound is a compound of the formula

wherein X is an aliphatic radical containing a carboxy group.

16. The method of claim 14 in which the heavy metal salt is a salt of a heavy metal occurring in the 6th to 12th positions of the first long period of the periodic table; and the aliphatic organic compound is a compound of the formula

wherein X is an aliphatic radical containing at least one carboxy group and at least one amino group.

17. The method of claim 14 in which the material polymerized is a mixture of butadiene-1,3 and a copolymerizable vinyl compound; the heavy metal salt is a salt of a heavy metal occurring in group VIII and the first long period of the periodic table; and the aliphatic organic compound is cystine.

18. The method of claim 14 in which the material polymerized is a mixture of butadiene-1,3 and acrylonitrile and the catalyst comprises cystine and a water soluble iron salt.

19. The method which comprises subjecting a mixture of a polymerizable conjugated butadiene and at least one other compound which contains a

group and is copolymerizable therewith in aqueous emulsion, to polymerization in aqueous emulsion in the presence of a catalyst comprising a complex compound of a heavy metal and an aliphatic organic compound containing at least one but not more than two divalent sulfur atoms and having at least one of said sulfur atoms connected by a single valence to an aliphatic radical containing at least one hydrophilic group, the concentration of the complex compound being less than 2% by weight of the material polymerized and such that the polymerization proceeds more rapidly than in the absence of the complex compound.

20. The method of claim 19 in which the heavy metal is a metal occurring in the 6th to 12th positions of the first long period of the periodic table.

WILLIAM D. STEWART.

---

Certificate of Correction

Patent No. 2,380,475.  July 31, 1945.

WILLIAM D. STEWART

It is hereby certified that error appears in the printed specification of the above numbered patent requiring correction as follows: Page 1, second column, line 10, for "thiolactic" read *thiolacetic*; and that the said Letters Patent should be read with this correction therein that the same may conform to the record of the case in the Patent Office.

Signed and sealed this 4th day of June, A. D. 1946.

[SEAL]

LESLIE FRAZER,
*First Assistant Commissioner of Patents.* ing such that the polymerization proceeds more rapidly than in the absence of the heavy metal salt.

11. The method of claim 10 in which the material polymerized is a mixture of butadiene-1,3 and a copolymerizable vinyl compound; and the heavy metal salt is a salt of a heavy metal occurring in the 6th to 12th positions of the first long period of the periodic table.

12. The method of claim 10 in which the material polymerized is a mixture of butadiene-1,3 and a copolymerizable vinyl compound; the heavy metal salt is a salt of a heavy metal occurring in the 6th to 12th positions of the first long period of the periodic table; and the aliphatic organic compound is glutathione.

13. The method of claim 10 in which the material polymerized is a mixture of butadiene-1,3 and acrylonitrile; and the catalyst comprises glutathione and a water soluble copper salt.

14. The method which comprises subjecting a mixture of a polymerizable conjugated butadiene and at least one other compound which contains a

group and is copolymerizable therewith in aqueous emulsion, to polymerization in aqueous emulsion in the presence of a catalyst comprising a water soluble heavy metal salt combined with an aliphatic organic compound of the formula

wherein X is an aliphatic radical containing at least one hydrophilic group, the total concentration of the heavy metal salt and the aliphatic organic compound being less than 2% by weight of the material polymerized and the concentration of the heavy metal salt being such that the polymerization proceeds more rapidly than in the absence of the heavy metal salt.

15. The method of claim 14 in which the heavy metal salt is a salt of a heavy metal occurring in the 6th to 12th positions of the first long period of the periodic table; and the aliphatic organic compound is a compound of the formula

wherein X is an aliphatic radical containing a carboxy group.

16. The method of claim 14 in which the heavy metal salt is a salt of a heavy metal occurring in the 6th to 12th positions of the first long period of the periodic table; and the aliphatic organic compound is a compound of the formula

wherein X is an aliphatic radical containing at least one carboxy group and at least one amino group.

17. The method of claim 14 in which the material polymerized is a mixture of butadiene-1,3 and a copolymerizable vinyl compound; the heavy metal salt is a salt of a heavy metal occurring in group VIII and the first long period of the periodic table; and the aliphatic organic compound is cystine.

18. The method of claim 14 in which the material polymerized is a mixture of butadiene-1,3 and acrylonitrile and the catalyst comprises cystine and a water soluble iron salt.

19. The method which comprises subjecting a mixture of a polymerizable conjugated butadiene and at least one other compound which contains a

group and is copolymerizable therewith in aqueous emulsion, to polymerization in aqueous emulsion in the presence of a catalyst comprising a complex compound of a heavy metal and an aliphatic organic compound containing at least one but not more than two divalent sulfur atoms and having at least one of said sulfur atoms connected by a single valence to an aliphatic radical containing at least one hydrophilic group, the concentration of the complex compound being less than 2% by weight of the material polymerized and such that the polymerization proceeds more rapidly than in the absence of the complex compound.

20. The method of claim 19 in which the heavy metal is a metal occurring in the 6th to 12th positions of the first long period of the periodic table.

WILLIAM D. STEWART.

Certificate of Correction

Patent No. 2,380,475.　　　　　　　　　　　　　　　　　　July 31, 1945.

WILLIAM D. STEWART

It is hereby certified that error appears in the printed specification of the above numbered patent requiring correction as follows: Page 1, second column, line 10, for "thiolactic" read *thiolacetic*; and that the said Letters Patent should be read with this correction therein that the same may conform to the record of the case in the Patent Office.

Signed and sealed this 4th day of June, A. D. 1946.

[SEAL]

LESLIE FRAZER,
*First Assistant Commissioner of Patents.*